United States Patent [19]

Brecht et al.

[11] Patent Number: 5,091,275

[45] Date of Patent: Feb. 25, 1992

[54] GLASS FIBER SEPARATOR AND METHOD OF MAKING

[75] Inventors: William B. Brecht, Hatfield, Pa.; John D. Windisch, Corvallis, Oreg.

[73] Assignee: Evanite Fiber Corporation, Corvallis, Oreg.

[21] Appl. No.: 514,301

[22] Filed: Apr. 25, 1990

[51] Int. Cl.⁵ .................................. H01M 2/16
[52] U.S. Cl. ..................... 429/247; 429/66; 429/57; 429/153; 429/118; 429/246; 429/248; 29/693.1
[58] Field of Search ............... 429/247, 66, 118, 246, 429/248, 57, 153, 253; 29/693.1

[56] References Cited

U.S. PATENT DOCUMENTS

| | | |
|---|---|---|
| 636,142 | 10/1899 | Hodgson . |
| 639,676 | 2/1902 | Willis . |
| 741,592 | 10/1903 | Roberts . |
| 1,897,562 | 9/1932 | Smith . |
| 1,942,668 | 1/1934 | Smith . |
| 2,578,534 | 12/1951 | Giles . |
| 3,085,126 | 4/1963 | Labino . |
| 3,726,717 | 4/1973 | Zaleski ........................ 429/153 |
| 4,216,280 | 8/1980 | Kono et al. . |
| 4,317,872 | 3/1982 | Varma . |
| 4,336,314 | 6/1982 | Yonezu et al. ................ 429/66 |
| 4,367,271 | 1/1983 | Hasegawa et al. . |
| 4,421,834 | 12/1983 | Zupancic . |
| 4,465,748 | 8/1984 | Harris . |
| 4,648,177 | 3/1987 | Uba et al. .................... 429/247 |

FOREIGN PATENT DOCUMENTS

| | | | |
|---|---|---|---|
| 3340091 | 9/1989 | European Pat. Off. ......... | 429/247 |
| 8101076 | 4/1981 | World Int. Prop. O. ........ | 29/623.1 |

OTHER PUBLICATIONS

"Comparison of Recombinant Lead Acid Battery Technologies," *Proceedings of International Telecommunications, Energy Conference, Oct., 1988*.

*Primary Examiner*—Brian E. Hearn
*Assistant Examiner*—M. Nuzzolillo
*Attorney, Agent, or Firm*—Klarquist, Sparkman, Campbell, Leigh & Whinston

[57] ABSTRACT

The separator (20) comprises a mat of glass micro-fibers and a binder. The binder is an aqueous mixture of colloidal silica particles and a sulfate salt. The mat is impregnated with the binder, compressed, and dried into a rigid state that makes the separator easy to handle. The binder is formulated to release the mat from the compressed state contacted by the sulfuric acid electrolyte between the electrode plates (24, 26) of the battery. The mat expands against the electrode plates to provide the separator-to-electrode contact that is necessary for proper battery performance. The silica particles of the binder then facilitate oxygen transport between the battery electrodes (24, 26).

12 Claims, 1 Drawing Sheet

GLASS FIBER SEPARATOR AND METHOD OF MAKING

TECHNICAL FIELD

This invention pertains to separators that are disposed between the electrode plates of batteries.

BACKGROUND INFORMATION

Lead-acid batteries include a plurality of electrode plates. The plates are arranged to establish alternating positive and negative electrodes. A separator is disposed between each pair of electrodes. The separators are formed of insulating material and prevent metallic deposits in the battery from forming short circuits between the electrode plates. The separator is porous, however, to the battery electrolyte so that current can pass from one plate to another.

Hydrolysis of water at the positive electrode of the battery produces oxygen. The oxygen reacts with the lead of the negative electrode to produce lead oxide. The lead oxide is thereafter reduced to metallic lead, liberating the oxygen which then reforms water. Generally, an increase in the rate with which the just described oxygen recombination process proceeds increases the operating voltage of the battery. The oxygen recombination process is limited by the rate of oxygen transport from the positive electrode to the negative electrode.

Amorphous silica chains have a surface chemistry that facilitates oxygen transport by a phenomena known as absorption and exchange. Accordingly, when silica is disposed between battery electrodes, the surface atoms of the silica readily bond to either oxygen or hydroxyl groups. The production of oxygen at the positive electrode and the depletion of the oxygen at the negative electrode establishes an oxygen concentration gradient that drives the transport of oxygen along the silica chains from the positive to the negative electrode.

After silica particles are mixed with the sulfuric acid electrolyte of the battery, the silica forms a three dimensional reticulated structure throughout the electrolyte. The reticulated silica increases the viscosity of the electrolyte to such an extent that the resultant fluid is commonly described as a gel.

Oxygen transport in a lead-acid battery also takes place in the form of diffusion of the gaseous phase of oxygen through open channels between the electrodes. The just described silica-based electrolytic gel provides, in addition to oxygen transport via absorption and exchange, fissures or channels through which gaseous oxygen can move between electrodes. The channels are formed in the gel as a result of a small amount of drying and cracking of the gel as water is lost during initial operation of the battery.

In the past, separators formed of micro-fibrous borosilicate glass mats or felt have been employed as battery separators. These separators (commonly known as absorptive glass mat separators) generally comprise a blend of glass fibers of varying length and diameter. The capillarity of the mats retains the electrolyte within the separator. Preferably, the mat is designed to saturate to about 80% to 95% with fluid electrolyte so that a void volume exists within the separator. This void volume provides gas channels through which the oxygen that is generated at the positive electrode may travel to the negative electrode. Accordingly, absorptive glass mat separators provide a high rate of oxygen transport.

Complex equipment is needed for placing and compressing the separator between the plates so that the appropriate contact will be developed. Moreover, absorptive glass mats have very low stiffness and are prone to tearing. Therefore, they have poor handling characteristics.

SUMMARY OF THE INVENTION

This invention is directed to an absorptive glass mat battery separator that can be handled in a rigid, compressed state during battery assembly and that will expand within the electrolyte between the electrode plates of the battery. The expansion of the separator provides the separator-to-electrode contact necessary for proper battery performance.

The separator of the present invention particularly comprises a mat formed of glass micro-fibers. The mat is impregnated with a binder that is an aqueous mixture of colloidal silica particles and a sulfate salt. The impregnated mat is dried and compressed. The salt coagulates the silica particles within the mat, thereby preventing migration of the silica particles to the surface of the mat as the mat is dried. As a result, the binder remains evenly distributed throughout the mat as the mat dries. The binder holds the dried mat in a rigid, compressed state so that the separator is easily handled.

The dry separator is compressed to a thickness that is slightly less than the specified distance between the electrode plates. Consequently, a separator may be placed between each pair of electrode plates within the battery without the use of complex equipment for compressing the separator between the plates during the assembly process.

As the battery electrolyte contacts the binder, the salt dissolves within the electrolyte, leaving behind the silica particles which have a high surface area and the appropriate surface chemistry for facilitating oxygen transport between the positive and negative electrodes.

As the binder salt dissolves, the mat expands against the surfaces of the electrode plates to generate the necessary operating contact between the plates and separator.

DETAILED DESCRIPTION OF THE PREFERRED EMBODIMENT

Figure 1:
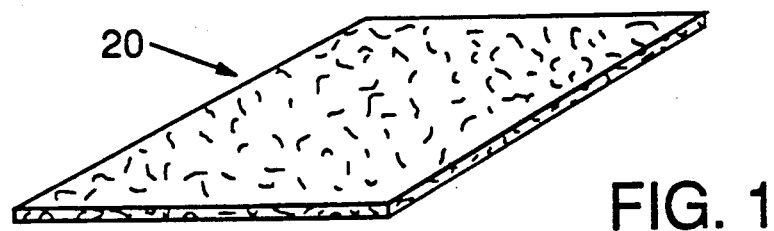
FIG. 1 is a perspective view of a glass fiber separator made in accordance with the present invention.

With reference to FIG. 1, the absorptive glass mat separator 20 of the present invention includes a mat of glass micro-fibers that is impregnated with a binder. The mat comprises glass micro-fibers of varying lengths and diameters. Preferably, the mat is formed of a blend of relatively fine fibers having averaged diameters in the range of 0.5 to 1.5 microns ($\mu$), and relatively coarse fibers having a diameter in the range of 1.5$\mu$ to 3.5 $\mu$. The fine fibers make up approximately 20% to 50%, by weight, of the fiber content of the mat and have an average surface area between 1.07 and 3.20 $M^2/g$. The coarse fibers have an average surface area between 0.46 and 1.07 $M^2/g$.

The blend of fibers just described provides capillarity in the mat sufficient for retaining battery electrolyte within the mat at a saturation level of about 80% to 95%.

The glass mat is formed on a conventional paper machine, such as one known in the trade as a Fourdrinier machine. The mat is then moved through an impregnating bath of an aqueous mixture of a binder. The binder mixture includes colloidal silica particles having diameters ranging between 4 to 80 millimicrons (m$\mu$) and a salt. It is contemplated that other forms of silica particles may be used, such as fumed or precipitated silica.

The salt component of the binder is preferably a sulfate salt and more preferably magnesium sulfate. The salt reacts with the silica particles to form a stable coagulum of silica particles substantially uniformly distributed throughout the glass mat.

Preferably, the binder mixture is formulated with 5% to 15%, by weight, total solids, and the ratio, by weight, of salt to silica particles is 1.5 to 1.0.

After the impregnated mat is removed from the bath, it is pressed lightly between rollers to remove excess binder mixture. The dried mat has sufficient stiffness when the added silica is from 5% to 30% of the pre-impregnated dry mat weight.

The wet mat is placed in a conventional drying oven for removing water from the mat. It is noteworthy that as the mat is dried, the coagulum binder precipitates in place throughout the thickness of the mat; that is, the silica particles are not free to migrate to the surface of the mat as the mat is dried. Consequently, the binder serves to bind together the entire thickness of the mat, which enhances the strength of the dried separator. Moreover, because the silica particles do not migrate from the center of the mat during drying, the silica particles are uniformly distributed throughout the separator for facilitating oxygen transport between electrodes as discussed above.

Figure 2:
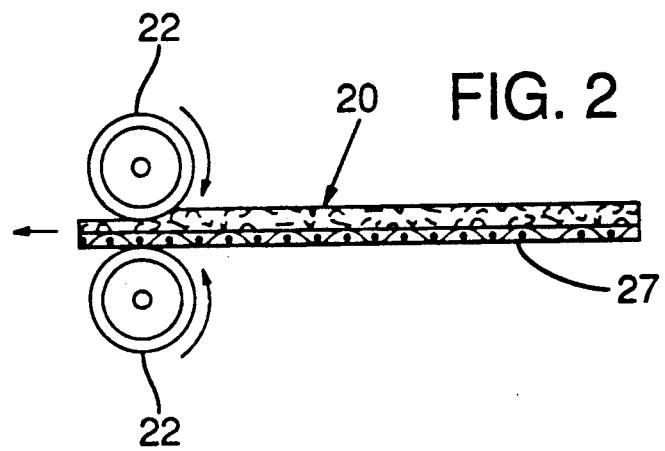
FIG. 2 is a diagram of a method for constructing the glass fiber separator wherein the binder-impregnated mat, supported by a carrier belt, is compressed between two rollers.
Figure 3:
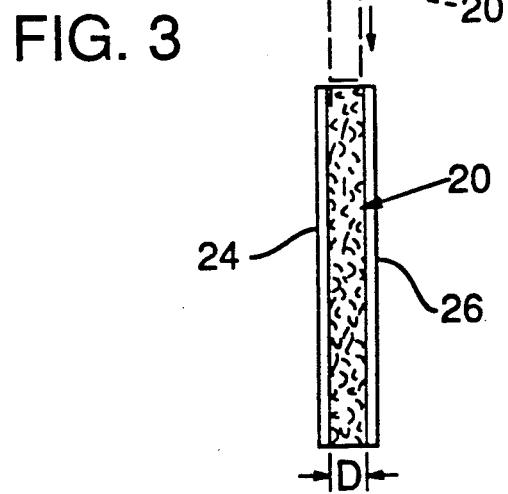
FIG. 3 is a diagram showing a side view of a separator disposed between two electrode plates.

The partially dried mat supported by carrier belt 27 is compressed to the desired thickness. This can be accomplished by two rollers 22 as shown (FIG. 2) or by other methods. In this regard, it is preferred that the separator be compressed to a thickness that is slightly less than the distance D between the facing surfaces of the two electrode plates 24, 26 (FIG. 3) between which the separator will be placed.

The amount that the dried separator may be compressed varies with the basis weight of the unimpregnated dry mat. For instance, a separator having a basis weight of approximately 300 g/$M^2$ will be compressible to about 75% of its uncompressed thickness. A mat having a base weight of 200 g/$M^2$ will be compressible to about 80% of its uncompressed thickness.

The compressed rigid separator 20 facilitates insertion between the battery electrode plates 24, 26 without further compressing the separator. The separator later expands, however, to bear against the electrode plates 24, 26 and thereby provide the separator-to-electrode contact that is necessary for proper performance of batteries using absorptive glass mat separators.

The expansion of the separator 20 takes place as the sulfuric acid electrolyte is added to the battery. As the acid contacts the binder, the sulfate salt dissolves to release the colloidal silica particles of the binder. Thus, the resiliency of the glass fibers and capillary forces drive the mat to expand against the electrode plates.

The contact developed between the facing surfaces of the electrode plates 24, 26 and the expanded separator 20 is a function of the degree of separator expansion. The thickness of such compressed separators has been observed to expand between 50% and 100% when the electrolyte is added to the separators and the separators are allowed to freely expand (i.e., without being placed between two electrode plates).

The precipitate of the salt and silica particles breaks down as the salt dissolves in the electrolyte. The high surface area and surface chemistry of the silica enhances oxygen transport between electrodes. It can be appreciated, therefore, that the binder employed in the present invention provides, in addition to an effective mechanism for binding and releasing the glass mat, a component that enhances the oxygen recombination efficiency of the cell once the binder is exposed to the electrolyte.

While the present invention has been described in accordance with a preferred embodiment, it is to be understood that certain substitutions and alterations may be made thereto without departing from the spirit and scope of the appended claims.

We claim:

1. A separator, comprising
   a mat formed of glass fibers; and
   binder means for binding the mat in a compressed state and for releasing the mat from the compressed state upon contact with sulfuric acid, the binder means comprising an aqueous mixture of colloidal silica particles and a salt.

2. The separator of claim 1 wherein the salt is a sulfate salt.

3. The separator of claim 2 wherein the salt is magnesium sulfate.

4. The separator of claim 1 wherein the silica particles are polymerized silicates.

5. A fibrous mat separator formed of a composite comprising a mixture of glass fibers bound with a mixture of colloidal silica particles and a salt, the composite being expandable upon contact with sulfuric acid, for placement between the facing surfaces of a pair of electrode plates that are spaced a distance D apart, the separator having a thickness that is not greater than the distance D.

6. The separator of claim 5 wherein the mat is expandable in thickness by at least approximately 50%.

7. A separator, comprising
   a mat formed of glass fibers; and
   a binder impregnating the mat, the binder comprising silica particles and a salt and being dried to bind the fibers in a compressed state, the binder being at least partly soluble in electrolyte to release the fibers for expansion of the fibers out of the compressed state.

8. A method of constructing a separator for a battery comprising the steps of:
   impregnating a fibrous silica mat with a binder that includes silica particles and a salt;
   compressing the impregnated mat; and
   drying the mat.

9. The method of claim 8 wherein the impregnating step includes the substep of making the binder with about one part by weight silica particles and about one and one-half parts salt.

10. The method of claim 8 wherein the salt is a sulfate salt.

11. The method of claim 10 wherein the salt is magnesium sulfate.

12. The method of claim 8 wherein the silica particles are colloidal polymerized silicates.

* * * * *